United States Patent
Osborn et al.

(10) Patent No.: US 12,452,759 B2
(45) Date of Patent: Oct. 21, 2025

(54) SYSTEMS AND METHODS FOR EXPANDABLE NETWORK SLICES IN A WIRELESS TELECOMMUNICATION NETWORK

(71) Applicant: DISH Wireless L.L.C., Englewood, CO (US)

(72) Inventors: Stacey Osborn, Arvada, CO (US); Jinsook Ryu, Oakton, VA (US)

(73) Assignee: DISH Wireless L.L.C., Englewood, CO (US)

( * ) Notice: Subject to any disclaimer, the term of this patent is extended or adjusted under 35 U.S.C. 154(b) by 762 days.

(21) Appl. No.: 17/749,741

(22) Filed: May 20, 2022

(65) Prior Publication Data

US 2023/0379785 A1  Nov. 23, 2023

(51) Int. Cl.
*H04W 36/08* (2009.01)
*H04W 36/00* (2009.01)
*H04W 36/32* (2009.01)

(52) U.S. Cl.
CPC ....... *H04W 36/32* (2013.01); *H04W 36/0033* (2013.01); *H04W 36/08* (2013.01)

(58) Field of Classification Search
CPC ............. H04W 36/32; H04W 36/0033; H04W 36/0064; H04W 36/0016; H04W 24/02;
(Continued)

(56) References Cited

U.S. PATENT DOCUMENTS 9,888,455 B1 *  2/2018  Laslo-Amit ............. B61L 25/02
11,317,321 B1 *  4/2022  Paczkowski .......... H04W 28/06
(Continued)

FOREIGN PATENT DOCUMENTS

CN         109743742 A     5/2019
WO       2023/285031 A1    1/2023

OTHER PUBLICATIONS

"3rd Generation Partnership Project; Technical Specification Group Radio Access Network; NG-RAN; Architecture description (Release 16)," 3GPP TS 38.401 V16.8.0, Dec. 2021, 79 pages.
(Continued)

*Primary Examiner* — Kevin T Bates
*Assistant Examiner* — Hector Reyes
(74) *Attorney, Agent, or Firm* — Jeremiah J. Baunach; Frontier IP Law PLLC

(57) ABSTRACT

Providing expandable network slices that may increase in geographic coverage area on-demand include includes enabling a user equipment device (UE) to operate on a network slice instance on a first Next Generation Node B (gNB) associated with a first cell in a 5G NR cellular network. While the UE is operating on the network slice instance, the system detects mobility of the UE that may require handover from the first gNB associated with the first cell on which the UE is operating to a second gNB associated with a second cell, in which the first gNB and second gNB belong to different tracking areas. While the UE is operating on the network slice instance, the system deploys and activates the same network slice instance on the second gNB that is associated with the second cell based on the detection of mobility of the UE.

18 Claims, 9 Drawing Sheets

(58) Field of Classification Search
CPC ............... H04W 48/18; H04L 41/0816; H04L 41/0895; H04L 41/40; H04L 41/5019
See application file for complete search history.

(56) References Cited

U.S. PATENT DOCUMENTS

| | | | |
|---|---|---|---|
| 2019/0230556 A1* | 7/2019 | Lee | H04W 28/16 |
| 2019/0327657 A1* | 10/2019 | Han | H04W 36/0055 |
| 2019/0357131 A1 | 11/2019 | Sivavakeesar et al. | |
| 2020/0053619 A1 | 2/2020 | Sartori et al. | |
| 2021/0037455 A1* | 2/2021 | Zhu | H04W 76/27 |
| 2022/0167262 A1* | 5/2022 | Ding | H04L 67/56 |
| 2023/0020027 A1* | 1/2023 | Buyukdura | H04W 28/16 |
| 2023/0336439 A1* | 10/2023 | Trujillo | H04L 45/586 |
| 2024/0306042 A1* | 9/2024 | Ping | H04W 28/24 |

OTHER PUBLICATIONS

International Search Report and Written Opinion received for PCT Patent Application No. PCT/US2023/020895, mailed on Aug. 3, 2023, 13 pages.
Manjeshwar, A. N., et al., "Enhanced UE Slice Mobility for 5G Multi-RAT Networks", 2019 IEEE Conference on Network Function Virtualization and Software Defined Networks (NFV-SDN), Nov. 12, 2019, pp. 1-6.
ZTE: "NW Slice Availability Handling Approaches during Mobility", 3GPP Draft; R3-171029 3GPP TSG RAN WG3 Meeting #95bis, Apr. 3, 2017, 6 pages.

* cited by examiner

SYSTEMS AND METHODS FOR EXPANDABLE NETWORK SLICES IN A WIRELESS TELECOMMUNICATION NETWORK

BACKGROUND

Efficient deployment of network slices is important for flexibility and saving resources in a wireless telecommunication network.

BRIEF SUMMARY

The advent and implementation of Fifth Generation (5G) wireless technology has resulted in faster speeds, better flexibility and increased bandwidth. In doing so, 5G wireless technology supports network slicing. Network slicing is utilized by mobile network operators (MNOs) to build and manage a wireless network that meets and exceeds the emerging requirements from a wide range of users. The network slice is a logically separated, self-contained, independent and secured part of the network, targeting different services with different requirements on speed, latency and reliability. Network slice characteristics are, for example, low latency, high bandwidth and ultra-reliability for a critical Internet-of-Things (IoT) use case or higher latency and lower bandwidth for a massive IoT use case. A network slice can be dedicated to one enterprise customer, or shared by multiple tenants. For example, a slice may consist of dedicated radio, transport and core resources including a dedicated user plane function at the edge. Another slice shares radio and transport resources between tenants, but provides dedicated core network functions per tenant.

However, a network slice instance must be deployed in a given geographic location in order for a device to successfully access and utilize it. This means that to make a service available for mobility use cases, a required network slice instance would potentially have to be deployed in all possible geographic areas even if it will not be used in that location 99% of the time causing unnecessary overhead and wasted resources. The systems and methods described herein address this problem by providing expandable network slices that may increase in geographic coverage area on-demand. Such expandable network slices may also be referred to as on-demand or self-expanding network slices.

Example embodiments include a method that enabling a user equipment device (UE) to operate on a network slice instance on a first Next Generation Node B (gNB) associated with a first cell in a 5G NR cellular network. While the UE is operating on the network slice instance, the system detects mobility of the UE that may require handover from the first gNB associated with the first cell on which the UE is operating to a second gNB associated with a second cell, in which the first gNB and second gNB belong to different tracking areas. While the UE is operating on the network slice instance, the system deploys and activates the same network slice instance on the second gNB that is associated with the second cell based on the detection of mobility of the UE.

As further description of the underlying wireless cellular telecommunication system supporting network slicing, 5G provides a broad range of wireless services delivered to the end user across multiple access platforms and multi-layer networks. 5G is a dynamic, coherent and flexible framework of multiple advanced technologies supporting a variety of applications. 5G utilizes an intelligent architecture, with Radio Access Networks (RANs) not constrained by base station proximity or complex infrastructure. 5G enables a disaggregated, flexible and virtualized radio access network (RAN) with interfaces creating additional data access points.

5G network functions may be completely software-based and designed as cloud-native, meaning that they're agnostic to the underlying cloud infrastructure, allowing higher deployment, agility and flexibility. With the advent of 5G, industry experts defined how the 5G core (5GC) network should evolve to support the needs of 5G New Radio (NR) and the advanced use cases enabled by it. The 3rd Generation Partnership Project (3GPP) develops protocols and standards for telecommunication technologies including RAN, core transport networks and service capabilities. 3GPP has provided complete system specifications for 5G network architecture which is much more service oriented than previous generations.

Multi-Access Edge Computing (MEC) is an important element of 5G architecture. MEC is an evolution in cloud computing that brings the applications from centralized data centers to the network edge, and therefore closer to the end users and their devices. This essentially creates a shortcut in content delivery between the user and host, and the long network path that once separated them.

This MEC technology is not exclusive to 5G but is certainly important to its efficiency. Characteristics of the MEC include the low latency, high bandwidth and real time access to RAN information that distinguishes 5G architecture from its predecessors. This convergence of the RAN and core networks enables operators to leverage new approaches to network testing and validation. 5G networks based on the 3GPP 5G specifications provide an environment for MEC deployment. The 5G specifications define the enablers for edge computing, allowing MEC and 5G to collaboratively route traffic. In addition to the latency and bandwidth benefits of the MEC architecture, the distribution of computing power is better enables the high volume of connected devices inherent to 5G deployment and the rise of IoT.

The 3rd Generation Partnership Project (3GPP) develops protocols for mobile telecommunications and has developed a standard for 5G. The 5G architecture is based on what is called a Service-Based Architecture (SBA), which implements IT network principles and a cloud-native design approach. In this architecture, each network function (NF) offers one or more services to other NFs via Application Programming Interfaces (API). Network function virtualization (NFV) decouples software from hardware by replacing various network functions such as firewalls, load balancers and routers with virtualized instances running as software. This eliminates the need to invest in many expensive hardware elements and can also accelerate installation times, thereby providing revenue generating services to the customer faster.

NFV enables the 5G infrastructure by virtualizing appliances within the 5G network. This includes the network slicing technology that enables multiple virtual networks to run simultaneously. NFV may address other 5G challenges through virtualized computing, storage, and network resources that are customized based on the applications and customer segments. The concept of NFV extends to the RAN through, for example, network disaggregation promoted by alliances such as O-RAN. This enables flexibility, provides open interfaces and open source development, ultimately to ease the deployment of new features and technology with scale. The O-RAN ALLIANCE objective is to allow multi-vendor deployment with off-the shelf hardware for the purposes of easier and faster inter-operability. Network disaggregation also allows components of the network to be virtualized, providing a means to scale and improve user experience as capacity grows. The benefits of virtualizing components of the RAN provide a means to be more cost effective from a hardware and software viewpoint especially for IoT applications where the number of devices is in the millions.

The 5G New Radio (5G NR) RAN comprises of a set of radio base stations (each known as Next Generation Node B (gNB)) connected to the 5G core (5GC) and to each other. The gNB incorporates three main functional modules: the Centralized Unit (CU), the distributed Unit (DU), and the Radio Unit (RU), which can be deployed in multiple combinations. The primary interface is referred to as the F1 interface between DU and CU and are interoperable across vendors. The CU may be further disaggregated into the CU user plane (CU-UP) and CU control plane (CU-CP), both of which connect to the DU over F1-U and F1-C interfaces respectively. This 5G RAN architecture is described in 3GPP TS 38.401 V 16.8.0 (2021-12). Each network function (NF) is formed by a combination of small pieces of software code called as microservices.

DETAILED DESCRIPTION

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

Figure 1:
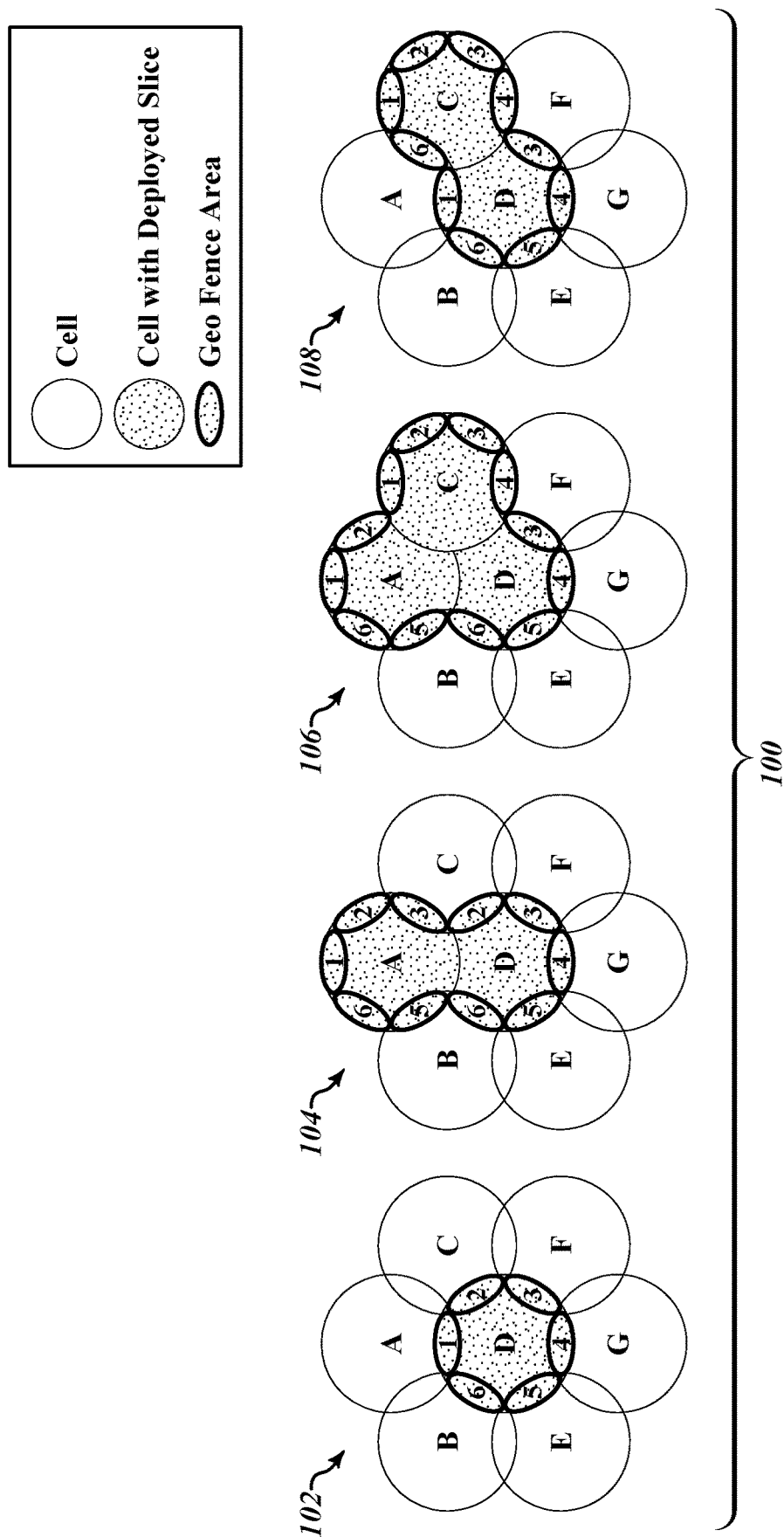
FIG. 1 illustrates a diagram of how a network slice instance may expand into different cells of a cellular telecommunication network in accordance with embodiments described herein.

FIG. 1 illustrates a diagram of how a network slice instance may expand into different cells of a cellular telecommunication network in accordance with embodiments described herein.

Shown left to right are different example states of expansion 100 of a network slice instance into different cells of a cellular telecommunication network. A group of cells, including cell A, cell B, cell C, cell D, cell E and cell F, are shown. Each cell in the group corresponds to a different cell site associated with a gNB in which a UE operating in the cellular telecommunication network may be located. In overlapping sections of the cells are respective geo-fenced areas, including, for example, geo-fenced area 1, geo-fenced area 2, geo-fenced area 3, geo-fenced area 4, geo-fenced area 5 and geo-fenced area 6, as shown in state 102. A special network slice parameter is included in the Generic Network Slice Template (GST) for the network slice instance. The parameter enables the establishment of the plurality of geo-fences defining the geo-fenced areas and enables the network slice instance to expand geographically. In particular, the parameter added to the GST enables geo-fences to be established within all cells where the network slice instance may be deployed, as shown in state 102. When a UE that is currently accessing the network slice enters a geo-fenced area (e.g., geo-fenced area 1 as shown in state 102) an alert will be automatically generated within the cellular telecommunication network notifying the network orchestrator that the network slice instance currently being used needs to be deployed to the neighboring cell site associated with the geo-fenced area that initiated the alert.

In the present example, the UE located in cell D has entered geo-fenced area 1 shown in state 102 and, as a result, an alert is automatically generated within the cellular telecommunication network causing the network orchestrator to deploy the network slice instance currently being used to the neighboring cell A as shown in state 104. Then, the UE now located in cell A has entered geo-fenced area 3 defined by the overlapping area of cell A and cell C shown in state 104 and, as a result, an alert is automatically generated within the cellular telecommunication network causing the network orchestrator to deploy the network slice instance currently being used also to the neighboring cell C as shown in state 106.

As another example, the UE located in cell D has entered geo-fenced area 2 shown in state 102 and, as a result, an alert is automatically generated within the cellular telecommunication network causing the network orchestrator to deploy the network slice instance currently being used to the neighboring cell C as shown in state 108.

In an example embodiment, once the network slice instance has been deployed to a new cell, an idle timer may be used to deactivate the network slice instance after a set amount of time has elapsed if the network slice has not been utilized, which saves network resources.

MNOs would traditionally have had to deploy network slice/service on a national scale in order to provide the same level of mobility coverage and slice consistency for a given customer's service requirements. However, the systems and methods disclosed herein for expandable network slices in a cellular telecommunication network more efficiently deploy cellular network slicing capabilities and service coverage to the specific locations as needed.

Figure 2:
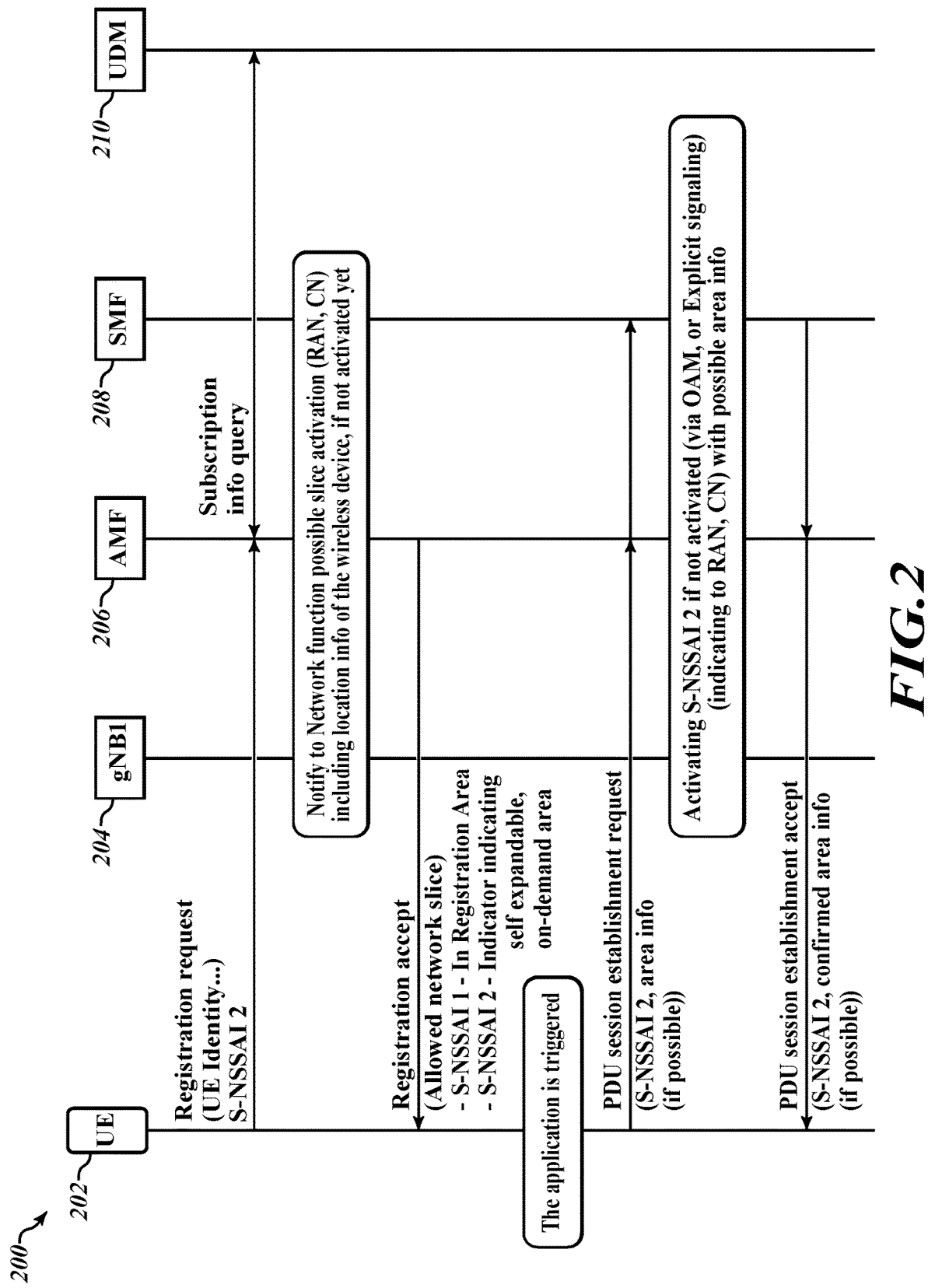
FIG. 2 is a sequence diagram showing interaction between the UE and different components of the 5G NR cellular network to establish a PDU session on an expandable network slice instance in accordance with embodiments described herein.

FIG. 2 is a sequence diagram 200 showing an example interaction between the UE 202 and different components of the 5G NR cellular network to establish a PDU session on an expandable network slice instance in accordance with embodiments described herein.

Shown are an example UE 202, a first gNB1 204, the Access & Mobility Management Function (AMF), the Session Management Function (SMF) and the Unified Data Management network function (UDM) 210 of an example 5G NR cellular telecommunication network. In the present example, three different network slice instances may be configured using three different corresponding Single Network Slice Selection Assistance Information (S-NSSAI) identifiers for each. For example, S-NSSAI 1 identifies a traditional non-expandable network slice and thus no specific area is identified by S-NSSAI 1. Also, the S-NSSAI 1, as a traditional (non-expandable) network slice, the mobile network operator (MNO) configures the service area for the network slice in the RAN and the RAN indicates to the core network (CN) (e.g., the (AMF)) the mapping information of the S-NSSAI and tracking area supporting the S-NSSAI during the setup/update procedure via the Next Generation Application Protocol (NGAP) interface. The RAN indicates to the CN (e.g., the (AMF)) the mapping information of the S-NSSAI and tracking area supporting the S-NSSAI during the setup/update procedure via the NGAP interface.

S-NSSAI 2 indicates that the network slice instance is expandable to cover a full area of the public land mobile network (PLMN) of the mobile network operator (MNO) operating the 5G NR cellular network. S-NSSAI 3 indicates that the network slice instance is expandable to cover a specific geographic area (group of tracking areas) within the full area of the PLMN of the MNO operating the 5G NR cellular network. There may also be, for example, S-NSSAI 4 which indicates that the network slice instance is expandable to cover a specific geographic area (group of tracking areas) within the PLMN, but has a frequency restriction (e.g., only FR2). Such expandable network slices may be provisioned by the AMF or pre-configured on the UE without gNB configuration. For a traditional network slice, the AMF may reject the requested network slice by a UE based on the UE location (tracking area) if the tracking area (the RAN) does not support the network slice. However, if the network slice is expandable as disclosed herein, the AMF does not take into account whether the RAN (i.e., the tracking area) supports the network slice. Optionally, the CN can ask for activation of the expandable network slice.

In various embodiments, the expandable network slices may be provisioned and configured in various different manners. For example, the S-NSSAI for the expandable network slice may indicate it is a PLMN available network slice without gNB configuration or instead may indicate that it is a locally available network slice (e.g., for particular states or a county) without gNB configuration. For those expandable network slices for a pre-defined area, the 5G system (5GS) may, for example, provide guaranteed QoS for the network slice. Outside of the pre-defined area, the 5GS may still serve the network slice but just with best effort without guaranteed QoS. As a further example, those expandable network slices that are full PLMN available network slices or those expandable network slices for a pre-defined area may be associated with or restricted to some frequency band (e.g., FR1, FR2. N71 . . . ). In particular, the Network Slice may be available for a certain frequency (e.g., FR1, FR2). However, in an example embodiment, the network slice is not restricted to RAN, core network (CN) capability, or the whole PLMN area available capability.

In the present example, a registration request is sent from the UE 202 to the AMF 206 for the expandable network slice identified by S-NSSAI 2. The AMF 206 sends a subscription information query to the UDM 210. In response to the subscription information query, the UDM 210 sends information to the AMF 206 indicating the network slice instance as expandable using the S-NSSAI 2. The 5GS notifies network functions of the 5G NR cellular network of possible network slice activation, including location information of the UE 202, based on the network slice is not being activated yet. A registration acceptance is sent from the AMF 206 to the UE 202, including the S-NSSAI 2 indicator indicating the network slice is self-expandable. This acceptance causes the UE 202 to trigger the application to establish a 5G Protocol Data Unit (PDU) session by sending a PDU session establishment request for the expandable network slice identified by S-NSSAI 2 to the AMF 206, which then sends it to the 5G Session Management Function (SMF) 108. The SMF 108 then responds by sending a PDU session establishment accept message to the AMF 206 for the expandable network slice identified by S-NSSAI 2. The AMF 206 then sends the PDU session establishment accept message for the expandable network slice identified by S-NSSAI 2 to the UE 202. In conjunction with the establishment of the PDU session, the expandable network slice identified by S-NSSAI 2 is activated on the first gNB1 204 if not already activated, via Operations, Administration, and Maintenance (OAM) of the 5GS, or explicit signaling, indicating to the RAN and CN to activate the expandable network slice identified by S-NSSAI 2, with possible area information associated with the expandable network slice.

Figure 3:
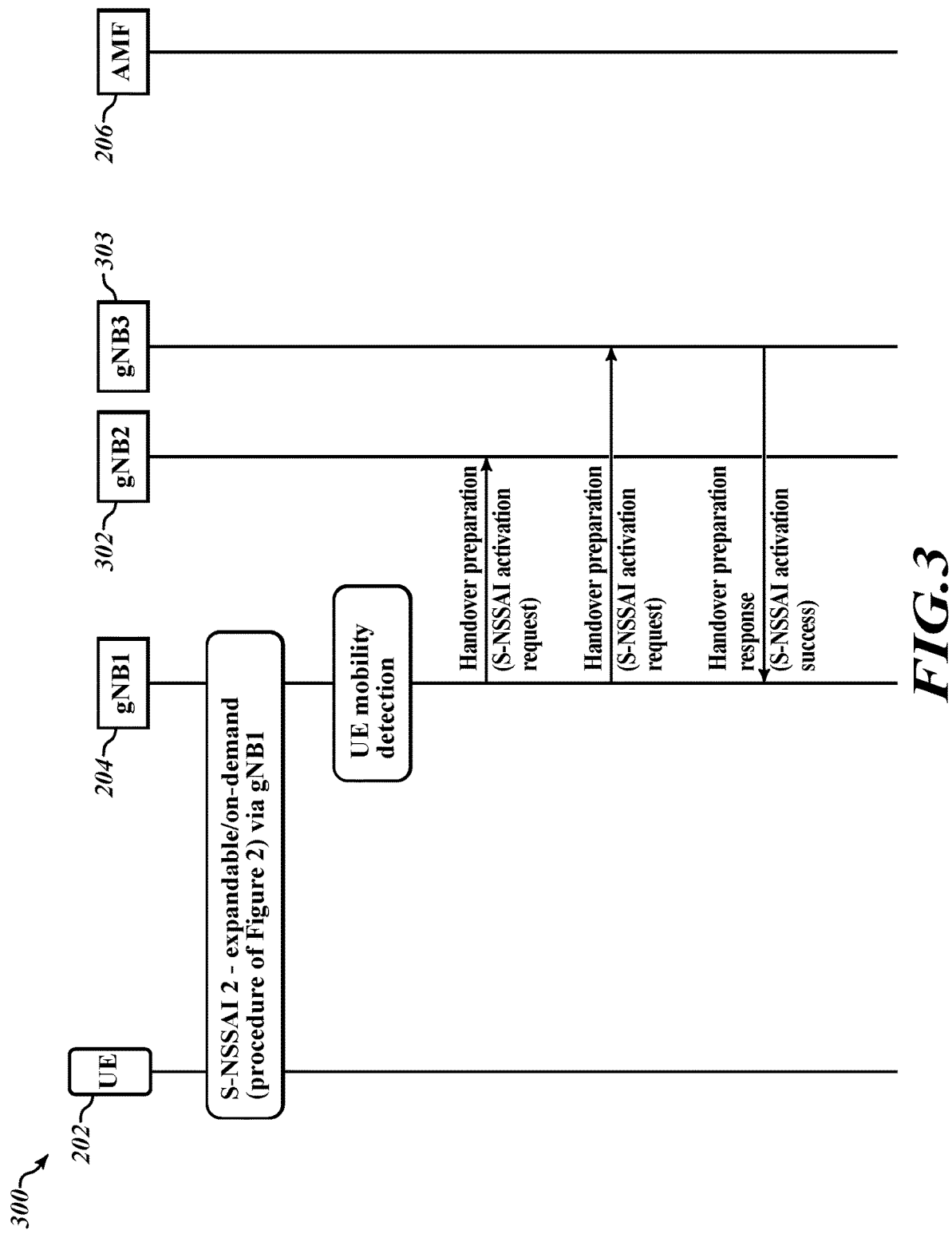
FIG. 3 is a sequence diagram showing interaction between the UE and different components of the 5G NR cellular network to use the expandable network slice instance after detecting mobility of the UE that requires handover from the first gNB in accordance with embodiments described herein.

FIG. 3 is a sequence diagram 300 showing interaction between the UE 202 and different components of the 5G NR cellular network to use the expandable network slice instance after detecting mobility of the UE 202 that requires handover from first gNB1 204 in accordance with embodiments described herein.

The operations shown in the timing diagram 300 occur after the operations shown in timing diagram 200 of FIG. 2. While the UE is operating on the network slice instance identified by S-NSSAI 2, mobility of the UE is detected that requires handover from first gNB1 204. The handover preparation including the S-NSSAI 2 activation request for the cell associated with second gNB2 302 is sent to second gNB2 302 and then the handover preparation including the S-NSSAI 2 activation request for the cell associated with third gNB2 303 is sent to third gNB3 303. In response, third gNB3 303 sends a handover preparation response including the activation success of the S-NSSAI 2 activation request for the cell associated with third gNB2 303.

Figure 4:
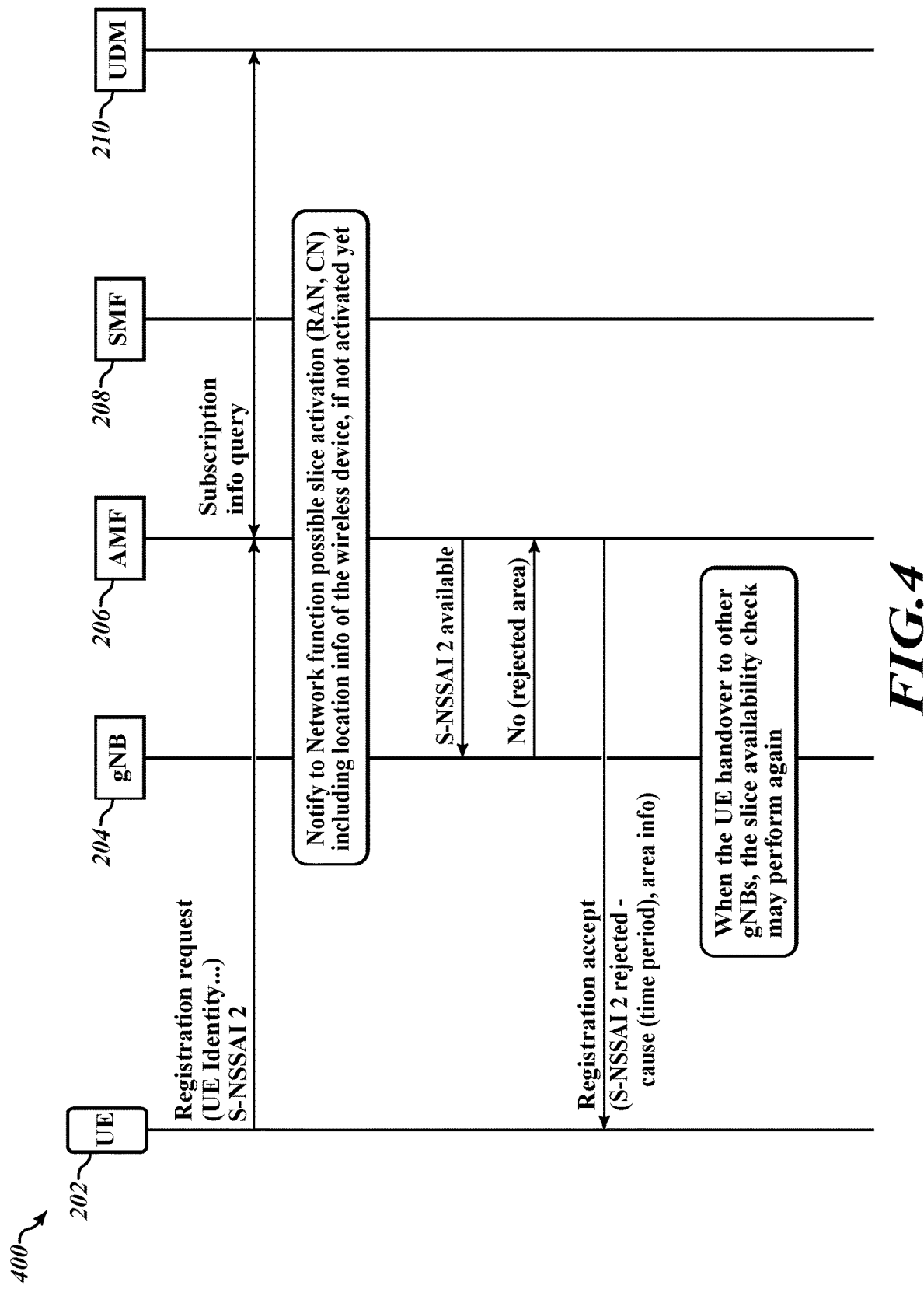
FIG. 4 is a sequence diagram showing interaction between the UE and different components of the 5G NR in a scenario when an expandable network slice is not available in accordance with embodiments described herein.

FIG. 4 is a sequence diagram 400 showing interaction between the UE 202 and different components of the 5G NR in a scenario when an expandable network slice is not available in accordance with embodiments described herein.

In the present example, a registration request is sent from the UE 202 to the AMF 206 for the expandable network slice identified by S-NSSAI 2. The AMF 206 sends a subscription information query to the UDM 210. In response to the subscription information query, the UDM 210 sends information to the AMF 206 indicating the network slice instance as expandable using the S-NSSAI 2. The 5GS notifies network functions of the 5G NR cellular network of possible network slice activation, including location information of the UE 202, based on the network slice is not being activated yet. A message is sent from the AMF 206 to the gNB1 204 that the expandable network slice identified by S-NSSAI 2 is available. However, in the present example the gNB1 204 indicates the S-NSSAI is not available or rejected for the activation. The registration request may be accepted but the registration request may indicate the S-NSSAI is not available or rejected for the activation. A message is then sent from the AMF 206 to the UE 202 indicating that the S-NSSAI is not available or rejected for the activation and the corresponding cause. However, when the UE 202 performs the handover process to other gNBs, the slice availability check may be performed again.

Figure 5:
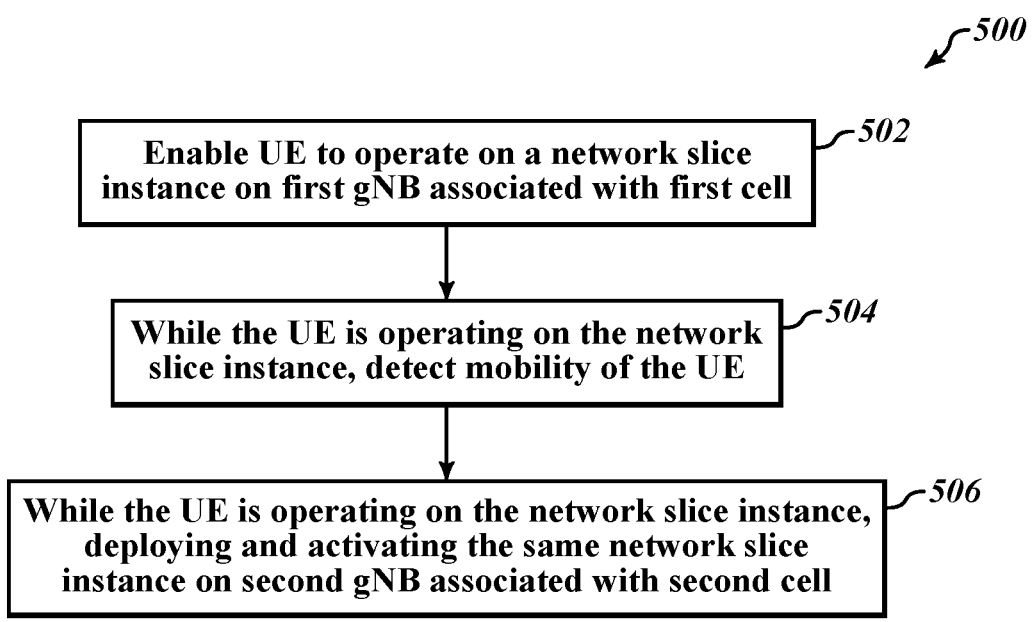
FIG. 5 illustrates a logical flow diagram showing an example embodiment of a process for deploying and activating an expandable network slice instance in accordance with embodiments described herein.

FIG. 5 illustrates a logical flow diagram showing an example embodiment of a process 500 for deploying and activating an expandable network slice instance in accordance with embodiments described herein.

At 502, the 5G system enables a user equipment device (UE) to operate on a network slice instance on a first Next Generation Node B (gNB) associated with a first cell in a 5G NR cellular network.

At 504, the 5G system, while the UE is operating on the network slice instance, detects mobility of the UE that may require handover from the first gNB associated with the first cell on which the UE is operating to a second gNB associated with a second cell, wherein the first gNB and second gNB belong to different tracking areas.

At 506, the 5G system, while the UE is operating on the network slice instance, deploys and activating the same network slice instance on the second gNB that is associated with the second cell based on the detecting mobility of the UE.

Figure 6:
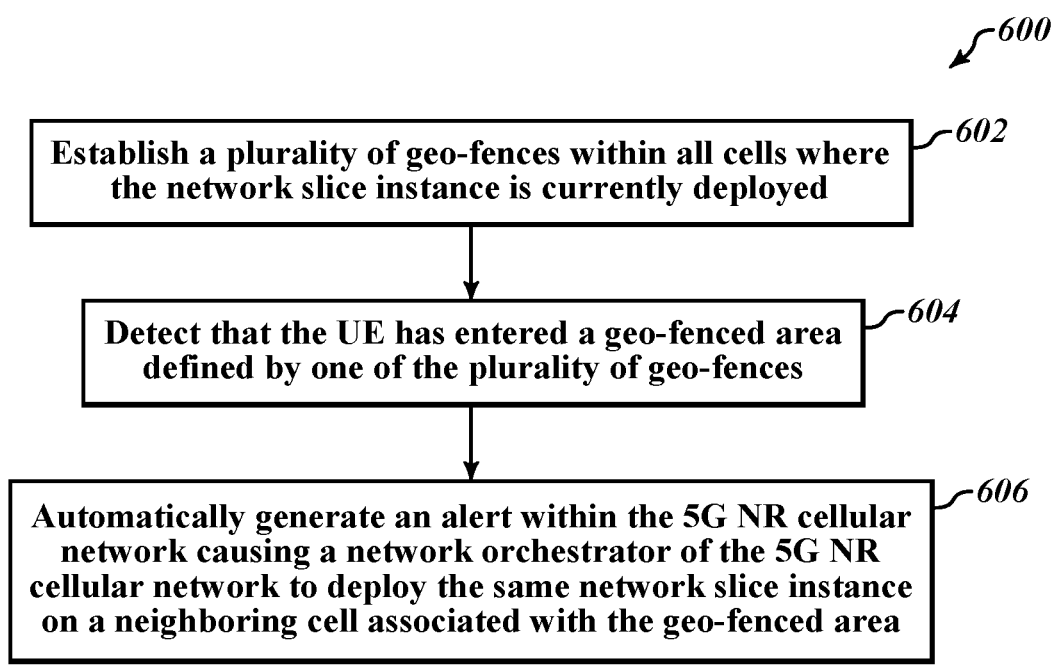
FIG. 6 illustrates a logical flow diagram showing an example embodiment of deploying and activating an expandable network slice instance involving a process for detecting mobility of the UE in accordance with embodiments described herein.

FIG. 6 illustrates a logical flow diagram showing an example embodiment of a process 600 for deploying and activating an expandable network slice instance involving a process for detecting mobility of the UE in accordance with embodiments described herein.

At 602, the 5G system establishes a plurality of geofences within all cells where the network slice instance is currently deployed. The establishment of the plurality of geo-fences may include adding a network slice parameter in a Generic Network Slice Template (GST) for the network slice instance that enables the establishment of the plurality of geo-fences and the network slice instance to expand geographically.

At 604, the 5G system detects that the UE has entered a geo-fenced area defined by one of the plurality of geo-fences. The detection of mobility of the UE that may require handover from the first gNB is in response to detecting that the UE has entered a geo-fenced area defined by one of the plurality of geo-fences.

At 606, the 5G system, in response to detecting that the UE has entered the geo-fenced area, automatically generates an alert within the 5G NR cellular network causing a network orchestrator of the 5G NR cellular network to deploy the same network slice instance on a neighboring cell associated with the geo-fenced area. The neighboring cell is the second cell referred to in process 500 of FIG. 5. Immediately after deploying and activating the same network slice instance on the second gNB that is associated with the second cell, the 5GS may start a timer to deactivate the network slice instance on the second gNB that is associated with the second cell in response to the network slice instance deployed on the second gNB not being utilized for pre-defined amount of time since starting the timer.

Figure 7:
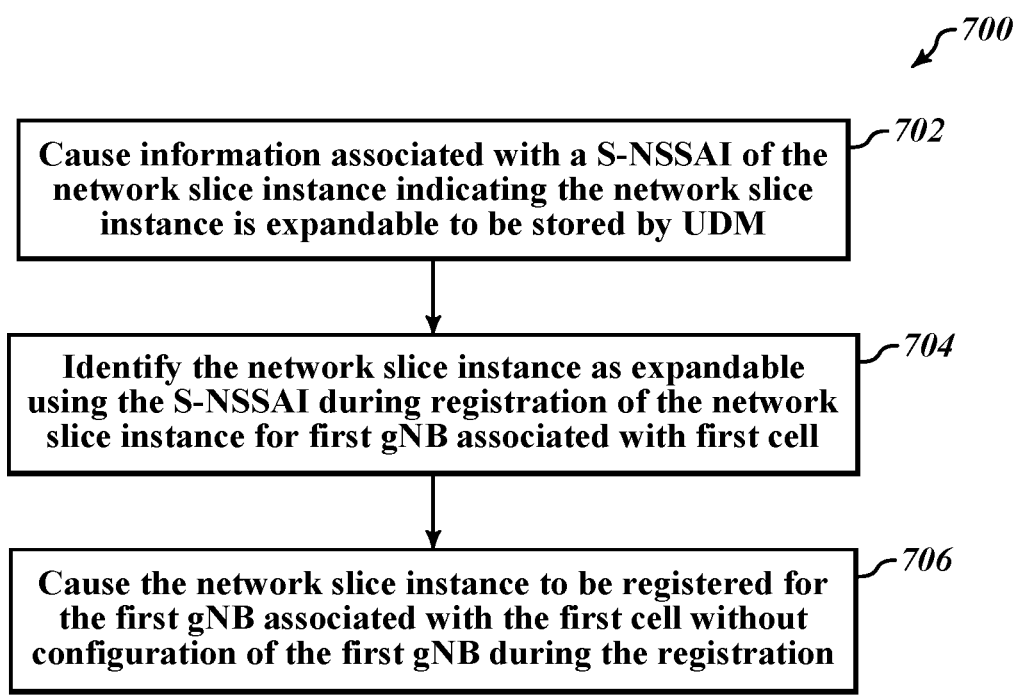
FIG. 7 illustrates a logical flow diagram showing an example embodiment of deploying and activating an expandable network slice instance involving causing the network slice instance to be registered for the first gNB associated with the first cell without configuration of the first gNB during the network slice instance registration in accordance with embodiments described herein.

FIG. 7 illustrates a logical flow diagram showing an example embodiment of a process 700 for deploying and activating an expandable network slice instance involving causing the network slice instance to be registered for the first gNB associated with the first cell without configuration of the first gNB during the network slice instance registration in accordance with embodiments described herein.

At 702, the 5G system causes information associated with Single Network Slice Selection Assistance Information (S-NSSAI) of the network slice instance indicating the network slice instance is expandable to be stored by a Unified Data Management network function (UDM) of the 5G NR cellular network.

At 704, the 5G system identifies the network slice instance as expandable using the S-NSSAI during registration of the network slice instance for the first gNB associated with the first cell via communication with the UDM network function. The identifying the network slice as expandable using the S-NSSAI during registration of the network slice instance may include: an Access & Mobility Management Function (AMF) receiving a network slice instance registration request from the UE; the AMF sending a subscription information query to the UDM; in response to the subscription information query, the UDM sending information to the AMF indicating the network slice instance as expandable using the S-NSSAI; and notifying network functions of the 5G NR cellular network of possible network slice activation, including location information of the UE, based on the network slice is not being activated yet.

In some embodiments, the S-NSSAI indicates that the network slice instance is expandable to cover a full area of a public land mobile network (PLMN) of a mobile network operator (MNO) operating the 5G NR cellular network. The S-NSSAI may instead indicate that the network slice instance is expandable to cover a specific geographic area within a full area of a public land mobile network (PLMN) of a mobile network operator (MNO) operating the 5G NR cellular network.

At 706, the 5G system causes the network slice instance to be registered for the first gNB associated with the first cell without configuration of the first gNB during the registration.

Figure 8:
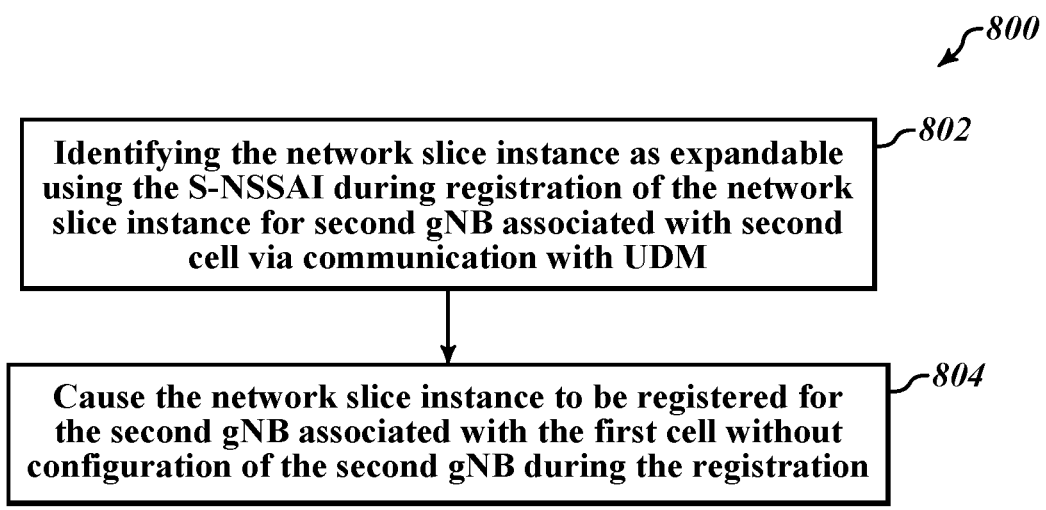
FIG. 8 illustrates a logical flow diagram showing an example embodiment of deploying and activating the same network slice instance on the second gNB that is associated with the second cell based on the detecting mobility of the UE in accordance with embodiments described herein.

FIG. 8 illustrates a logical flow diagram showing an example embodiment of a process 800 deploying and activating the same network slice instance on the second gNB that is associated with the second cell based on the detecting mobility of the UE in accordance with embodiments described herein.

At 802, the 5G system, based on the detecting mobility of the UE, identifies the network slice instance as expandable using the S-NSSAI during registration of the network slice instance for the second gNB associated with the second cell via communication with the UDM network function.

At 804, the 5G system, based on the detecting mobility of the UE, causes the network slice instance to be registered for the second gNB associated with the first cell without configuration of the second gNB during the registration.

Figure 9:
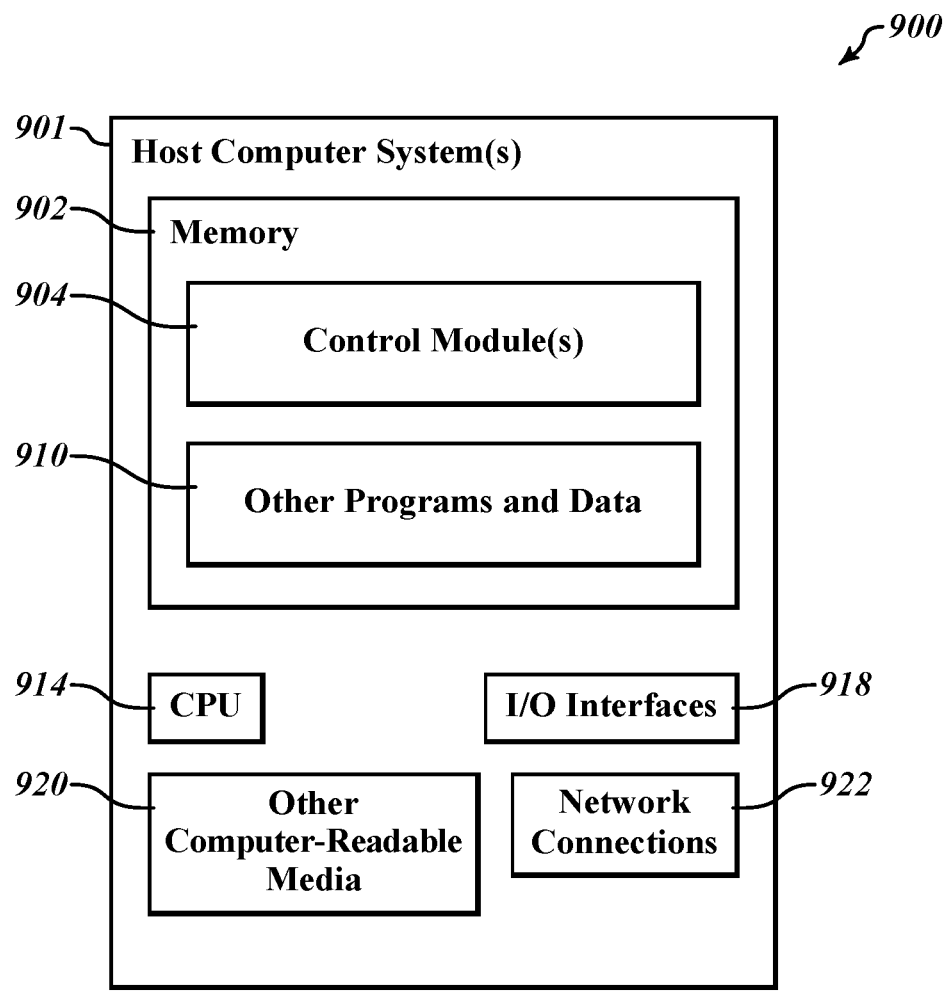
FIG. 9 shows a system diagram that describes an example implementation of computing system(s) for implementing embodiments described herein.

FIG. 9 shows a system diagram that describes an example implementation of computing system(s) for implementing embodiments described herein.

The functionality described herein for expandable network slices in a wireless telecommunication network, or components thereof, can be implemented either on dedicated hardware, as a software instance running on dedicated hardware, or as a virtualized function instantiated on an appropriate platform, e.g., a cloud infrastructure. In some embodiments, such functionality may be completely software-based and designed as cloud-native, meaning that they're agnostic to the underlying cloud infrastructure, allowing higher deployment agility and flexibility. However, FIG. 9 illustrates an example of underlying hardware on which such software and functionality may be hosted and/or implemented.

In particular, shown is example host computer system(s) 901. For example, such computer system(s) 901 may represent one or more of those in various data centers, base stations and cell sites that are, or that host or implement the functions of, aspects described herein to implement expandable network slices in a wireless telecommunication network. In some embodiments, one or more special-purpose computing systems may be used to implement the functionality described herein. Accordingly, various embodiments described herein may be implemented in software, hardware, firmware, or in some combination thereof. Host computer system(s) 901 may include memory 902, one or more central processing units (CPUs) 914, I/O interfaces 918, other computer-readable media 920, and network connections 922.

Memory 902 may include one or more various types of non-volatile and/or volatile storage technologies. Examples of memory 902 may include, but are not limited to, flash memory, hard disk drives, optical drives, solid-state drives, various types of random access memory (RAM), various types of read-only memory (ROM), neural networks, other computer-readable storage media (also referred to as processor-readable storage media), or the like, or any combination thereof. Memory 902 may be utilized to store information, including computer-readable instructions that are utilized by CPU 914 to perform actions, including those of embodiments described herein.

Memory 902 may have stored thereon control module(s) 904. The control module(s) 904 may be configured to implement and/or perform some or all of the functions of the systems, components and modules described herein to implement expandable network slices in a wireless telecommunication network. Memory 902 may also store other programs and data 910, which may include rules, databases, application programming interfaces (APIs), software containers, nodes, pods, software defined data centers (SDDCs), microservices, virtualized environments, software platforms, cloud computing service software, network management software, network orchestrator software, network functions (NF), artificial intelligence (AI) or machine learning (ML) programs or models to perform the functionality described herein, user interfaces, operating systems, other network management functions, other NFs, etc.

Network connections 922 are configured to communicate with other computing devices to facilitate the functionality described herein. In various embodiments, the network connections 922 include transmitters and receivers (not illustrated), cellular telecommunication network equipment and interfaces, and/or other computer network equipment and interfaces to send and receive data as described herein, such as to send and receive instructions, commands and data to implement the processes described herein. I/O interfaces 918 may include a video interfaces, other data input or output interfaces, or the like. Other computer-readable media 920 may include other types of stationary or removable computer-readable media, such as removable flash drives, external hard drives, or the like.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for expandable network slices in a 5G NR cellular network comprising:
enabling a user equipment device (UE) to operate on a network slice instance on a first Next Generation Node B (gNB) associated with a first cell in a 5G NR cellular network;
while the UE is operating on the network slice instance, detecting mobility of the UE that may require handover from the first gNB associated with the first cell on which the UE is operating to a second gNB associated with a second cell, wherein the first gNB and second gNB belong to different tracking areas; and while the UE is operating on the network slice instance, deploying and activating the same network slice instance on the second gNB that is associated with the second cell based on the detecting mobility of the UE, wherein the enabling the UE to operate on a network slice instance in a 5G NR cellular network includes:

causing information associated with Single Network Slice Selection Assistance Information (S-NSSAI) of the network slice instance indicating the network slice instance is expandable to be stored by a Unified Data Management network function (UDM) of the 5G NR cellular network;

identifying the network slice instance as expandable using the S-NSSAI during registration of the network slice instance for the first gNB associated with the first cell via communication with the UDM network function; and causing the network slice instance to be registered for the first gNB associated with the first cell without configuration of the first gNB during the registration.

2. The method of claim 1 wherein the detecting mobility of the UE includes:

establishing a plurality of geo-fences within all cells where the network slice instance is currently deployed; and detecting that the UE has entered a geo-fenced area defined by one of the plurality of geo-fences, wherein the detecting mobility of the UE that may require handover from the first gNB is in response to detecting that the UE has entered a geo-fenced area defined by one of the plurality of geo-fences.

3. The method of claim 2 wherein the establishing the plurality of geo-fences includes adding a network slice parameter in a Generic Network Slice Template (GST) for the network slice instance that enables the establishing of the plurality of geo-fences and the network slice instance to expand geographically.

4. The method of claim 2 wherein the deploying and activating the same network slice instance on the second gNB that is associated with the second cell includes:

in response to detecting that the UE has entered the geo-fenced area, automatically generating an alert within the 5G NR cellular network causing a network orchestrator of the 5G NR cellular network to deploy the same network slice instance on a neighboring cell associated with the geo-fenced area, wherein the neighboring cell is the second cell.

5. The method of claim 4, further comprising:

immediately after deploying and activating the same network slice instance on the second gNB that is associated with the second cell, starting a timer to deactivate the network slice instance on the second gNB that is associated with the second cell in response to the network slice instance deployed on the second gNB not being utilized for pre-defined amount of time since starting the timer.

6. The method of claim 1 wherein the identifying the network slice as expandable using the S-NSSAI during registration of the network slice instance includes:

an Access & Mobility Management Function (AMF) receiving a network slice instance registration request from the UE;

the AMF sending a subscription information query to the UDM;

in response to the subscription information query, the UDM sending information to the AMF indicating the network slice instance as expandable using the S-NSSAI; and notifying network functions of the 5G NR cellular network of possible network slice activation, including location information of the UE, based on the network slice is not being activated yet.

7. The method of claim 1 wherein the S-NSSAI indicates that the network slice instance is expandable to cover a full area of a public land mobile network (PLMN) of a mobile network operator (MNO) operating the 5G NR cellular network.

8. The method of claim 1 wherein the S-NSSAI indicates that the network slice instance is expandable to cover a specific geographic area within a full area of a public land mobile network (PLMN) of a mobile network operator (MNO) operating the 5G NR cellular network.

9. The method of claim 1 wherein the deploying and activating the same network slice instance on the second gNB that is associated with the second cell based on the detecting mobility of the UE includes:

based on the detecting mobility of the UE:

identifying the network slice instance as expandable using the S-NSSAI during registration of the network slice instance for the second gNB associated with the second cell via communication with the UDM network function; and causing the network slice instance to be registered for the second gNB associated with the first cell without configuration of the second gNB during the registration.

10. A system for expandable network slices in a 5G NR cellular network, the system comprising:

at least one memory that stores computer executable instructions; and at least one processor that executes the computer executable instructions to cause operations to be performed, the operations including:

enabling a user equipment device (UE) to operate on a network slice instance on a first Next Generation Node B (gNB) associated with a first cell in a 5G NR cellular network;

while the UE is operating on the network slice instance, detecting mobility of the UE that may require handover from the first gNB associated with the first cell on which the UE is operating to a second gNB associated with a second cell, wherein the first gNB and second gNB belong to different tracking areas; and while the UE is operating on the network slice instance, deploying and activating the same network slice instance on the second gNB that is associated with the second cell based on the detecting mobility of the UE, wherein the enabling the UE to operate on a network slice instance in a 5G NR cellular network includes:

causing information associated with Single Network Slice Selection Assistance Information (S-NSSAI) of the network slice instance indicating the network slice instance is expandable to be stored by a Unified Data Management network function (UDM) of the 5G NR cellular network:

identifying the network slice instance as expandable using the S-NSSAI during registration of the network slice instance for the first gNB associated with the first cell via communication with the UDM network function; and causing the network slice instance to be registered for the first gNB associated with the first cell without configuration of the first gNB during the registration.

11. The system of claim 10 wherein the detecting mobility of the UE includes:

establishing a plurality of geo-fences within all cells where the network slice instance is currently deployed; and detecting that the UE has entered a geo-fenced area defined by one of the plurality of geo-fences, wherein the detecting mobility of the UE that may require handover from the first gNB is in response to detecting that the UE has entered a geo-fenced area defined by one of the plurality of geo-fences.

12. The system of claim 11 wherein the establishing the plurality of geo-fences includes adding a network slice parameter in a Generic Network Slice Template (GST) for the network slice instance that enables the establishing of the plurality of geo-fences and the network slice instance to expand geographically.

13. The system of claim 11 wherein the deploying and activating the same network slice instance on the second gNB that is associated with the second cell includes:

in response to detecting that the UE has entered the geo-fenced area, automatically generating an alert within the 5G NR cellular network causing a network orchestrator of the 5G NR cellular network to deploy the same network slice instance on a neighboring cell associated with the geo-fenced area, wherein the neighboring cell is the second cell.

14. The system of claim 13, wherein the operations further include:

immediately after deploying and activating the same network slice instance on the second gNB that is associated with the second cell, starting a timer to deactivate the network slice instance on the second gNB that is associated with the second cell in response to the network slice instance deployed on the second gNB not being utilized for pre-defined amount of time since starting the timer.

15. A non-transitory computer-readable storage medium having computer-executable instructions stored thereon that, when executed by at least one processor, cause the at least one processor to cause actions to be performed, the actions including:

enabling a user equipment device (UE) to operate on a network slice instance on a first Next Generation Node B (gNB) associated with a first cell in a 5G NR cellular network;

while the UE is operating on the network slice instance, detecting mobility of the UE that may require handover from the first gNB associated with the first cell on which the UE is operating to a second gNB associated with a second cell, wherein the first gNB and second gNB belong to different tracking areas; and while the UE is operating on the network slice instance, deploying and activating the same network slice instance on the second gNB that is associated with the second cell based on the detecting mobility of the UE, wherein the enabling the UE to operate on a network slice instance in a 5G NR cellular network includes:

causing information associated with Single Network Slice Selection Assistance Information (S-NSSAI) of the network slice instance indicating the network slice instance is expandable to be stored by a Unified Data Management network function (UDM) of the 5G NR cellular network;

identifying the network slice instance as expandable using the S-NSSAI during registration of the network slice instance for the first gNB associated with the first cell via communication with the UDM network function; and causing the network slice instance to be registered for the first gNB associated with the first cell without configuration of the first gNB during the registration.

16. The non-transitory computer-readable storage medium of claim 15 wherein the identifying the network slice as expandable using the S-NSSAI during registration of the network slice instance includes:

an Access & Mobility Management Function (AMF) receiving a network slice instance registration request from the UE;

the AMF sending a subscription information query to the UDM;

in response to the subscription information query, the UDM sending information to the AMF indicating the network slice instance as expandable using the S-NSSAI; and notifying network functions of the 5G NR cellular network of possible network slice activation, including location information of the UE, based on the network slice is not being activated yet.

17. The non-transitory computer-readable storage medium of claim 15 wherein the S-NSSAI indicates that the network slice instance is expandable to cover a full area of a public land mobile network (PLMN) of a mobile network operator (MNO) operating the 5G NR cellular network.

18. The non-transitory computer-readable storage medium of claim 15 wherein the S-NSSAI indicates that the network slice instance is expandable to cover a specific geographic area within a full area of a public land mobile network (PLMN) of a mobile network operator (MNO) operating the 5G NR cellular network.

* * * * *